United States Patent [19]

Hoogesteger et al.

[11] Patent Number: 5,514,206

[45] Date of Patent: May 7, 1996

[54] AIR/GAS SEPARATOR DEVICE

[75] Inventors: James L. Hoogesteger; Wayne A. Damrau, both of Wisconsin Rapids, Wis.

[73] Assignee: Consolidated Papers, Inc., Wisconsin Rapids, Wis.

[21] Appl. No.: 228,281

[22] Filed: Apr. 15, 1994

[51] Int. Cl.⁶ .................................................. B01D 11/00
[52] U.S. Cl. .............................. 96/209; 95/261; 96/210; 96/211
[58] Field of Search ........................ 95/241, 260, 261; 96/208, 209, 210, 211, 216

[56] References Cited

U.S. PATENT DOCUMENTS

| | | | |
|---|---|---|---|
| Re. 27,882 | 1/1974 | Burnham | 55/41 |
| 806,129 | 5/1905 | Ford | 55/457 |
| 2,200,620 | 5/1940 | Findley | 237/12.3 B |
| 2,231,501 | 2/1941 | Jepertinger | 237/12.3 B |
| 2,316,729 | 4/1943 | Tryon | 96/212 |
| 2,346,005 | 4/1944 | Bryson | 210/788 |
| 2,578,568 | 12/1951 | Mayer et al. | 96/210 |
| 2,645,346 | 7/1953 | Staege et al. | 209/725 |
| 2,811,219 | 10/1957 | Wenzl | 96/209 |
| 3,163,508 | 12/1964 | Tuck et al. | 95/242 |
| 3,243,941 | 4/1966 | Peterson | 96/209 |
| 3,276,188 | 10/1966 | Carlson | 96/212 |
| 3,915,679 | 10/1975 | Roach et al. | 55/347 |
| 4,120,673 | 10/1978 | Neiden | 96/210 |
| 4,290,791 | 9/1981 | Matsui et al. | 96/212 |
| 4,369,047 | 1/1983 | Arscott et al. | 95/243 |
| 4,617,031 | 10/1986 | Suh et al. | 96/208 |
| 4,643,746 | 2/1987 | Suzuki et al. | 96/209 |
| 4,662,908 | 5/1987 | Suzuki et al. | 96/211 |
| 5,149,341 | 9/1992 | Taylor et al. | 95/260 |
| 5,203,891 | 4/1993 | Lema | 96/210 |
| 5,240,477 | 8/1993 | Yamaga et al. | 95/261 |

FOREIGN PATENT DOCUMENTS

| | | | |
|---|---|---|---|
| 765540 | 8/1971 | Belgium | 96/208 |
| 759106 | 8/1980 | U.S.S.R. | 96/216 |
| 1510475 | 5/1978 | United Kingdom | 96/208 |

OTHER PUBLICATIONS

Ishikawajima–Harima Jukogyo Kabushiki Kaisha "Vari–d–well–time Blade Coater" brochure, 4 pages, no date.
Black Clawson Air Separation System for Coatings, 2 pages, no date.
Tappi Proceedings, 1987 Coating Conference cover, pp. 141–149.

*Primary Examiner*—Jay H. Woo
*Assistant Examiner*—Duane S. Smith
*Attorney, Agent, or Firm*—Juettner Pyle Lloyd & Piontek

[57] ABSTRACT

A gas/air or bubble separator is disclosed, particularly for use with supplying air/gas or bubble free coating liquid to a paper coater. The separator includes three cast elements containing three formed chambers, a distribution chamber at the top of the device which supplies incoming liquid to a plurality of separators which operate on the vortex principle, a liquid collection chamber for collecting the essentially or substantially air/gas or bubble free liquid at the bottom of the device, and an air/gas bubble collection chamber above the vortex separators for collecting the gas/air or bubble containing liquid. These chambers are of cast construction and made of stainless steel so that no weld need be used. The device has essentially inline flow for the bulk of the liquid from inlet to outlet and clean streamline design with no dead spaces to prevent accumulations, build ups and problems associated with the same. The vortex separators are made in parts and they can be replaced or individually optimized to achieve air/gas or bubble free operation at high coater speeds of 3,000 to 6,000 feet per minute.

18 Claims, 4 Drawing Sheets

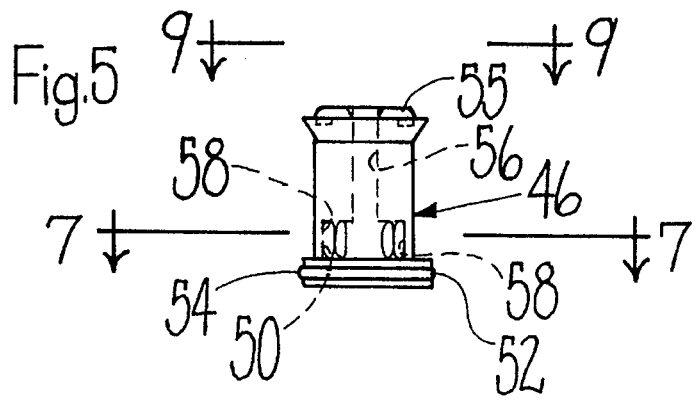
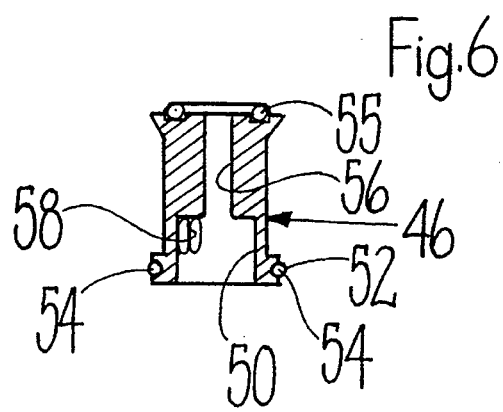
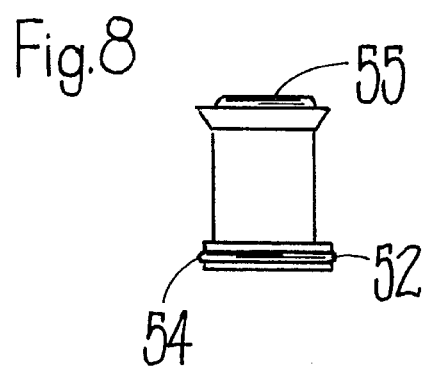
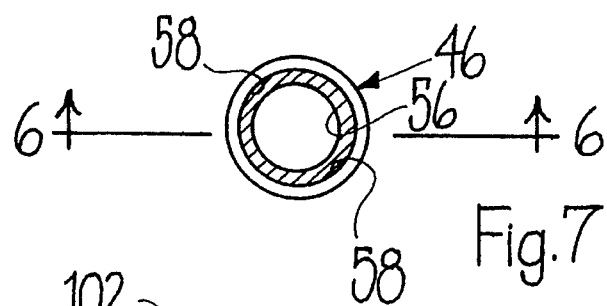
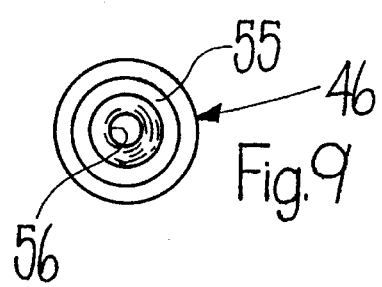
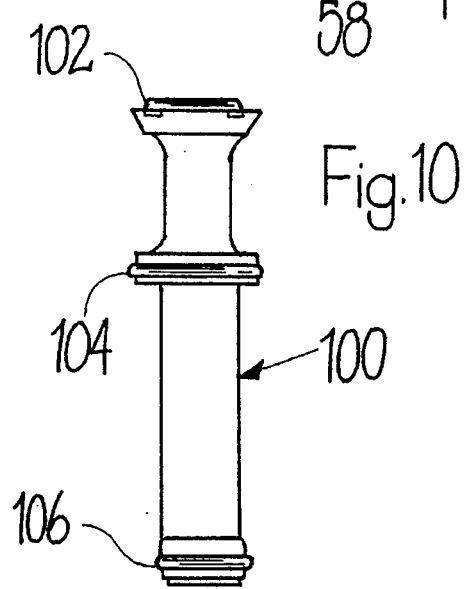

AIR/GAS SEPARATOR DEVICE

DISCLOSURE

This invention relates to a gas/air bubble removal device, and more particularly to such a device for removing gas/air bubbles from coating liquid used in the paper industry.

BACKGROUND OF THE INVENTION

Liquid-gas/air separating devices are used in industry for various applications. For example, in the papermaking field in one instance such a separating device is useful in removing air or gas bubbles from coating liquid which is going to be applied to a moving web of paper. As papermaking techniques and papermaking and coating machines have improved and increased in speed, it has become necessary to provide as air or gas free coating liquid to the paper coaters to prevent gas or air bubble entrainment defects from appearing in the coated paper web or sheet. While there is no problem at say slow speeds, of say 2,000 feet per minute web speeds, when web speeds exceed 3,000 or 4,000 feet per minute and/or approach 6,000 feet per minute or beyond nearly every aspect must be optimized to minimize paper coating defects, and particularly those due to air entrainment in the coating supplied to the coater. While some coaters are not as sensitive to air entrainment problems as others, those coaters that generally are capable of operating at these higher speeds are sensitive to air/gas entrainment. It makes for good paper and coating practice to provide the coater, irrespective of its type, with as gas/air bubble free coating liquid as possible.

Heretofore it has been long known to separate gas or air bubbles from a liquid. For example, see U.S. Pat. No. 3,163,508 which uses the vortex rotation action to separate gas bubbles carried in a liquid. Other means have been used to create the rotational motion which causes the centripetal-centrifugal force resulting in the separation of lighter materials such as gases from heavier materials such as the carrier liquids. One example of such unit is shown in U.S. Pat. No. 5,149,341 which uses a plurality of separating tubes with helical flights therein to cause such rotational motion. In order to achieve adequate flow rate a plurality of separation tubes are frequently ganged together. For example, see U.S. Pat. No. 5,149,341 patent which has the gas entrained liquid entering the bottom of the separating unit with a plurality of separating tubes, each one using the above mentioned helical flights, with the separated gas bubbles being discharged from the top of the separating tubes and the separated liquid also being discharged from the top of the separating tubes and then off to one side of the separating unit.

SUMMARY OF THE PRESENT INVENTION

The present invention is an improved air/gas or bubble separator device comprising an inlet which receives the liquid which may contain gas or air to be separated at the top of the device, an outlet for the gas or air free liquid at the bottom of the device, a separating portion containing a plurality of vortex separator means, in the form of tubes, each of which like the U.S. Pat. No. 3,363,508 receives a spinning flow of incoming liquid at the periphery and discharges essentially gas or air bubble free liquid at the bottom, and any gas or air or bubble containing liquid or foam at the top. Unlike the prior device of the U.S. Pat. No. 5,149,341, the essentially bubble free gas or air liquid and the separated gas or air bubbles or liquid containing the same is discharged out opposite ends of the device and out, particularly, opposite ends of each of the vortex tubes. The inlet and outlet for the device are arranged generally in a linear manner to facilitate installation of the device in a conventional coating station piping system. Further the device's members are completely disassemblable to facilitate cleaning of the device of the present invention to prevent and to remove any potential build up which could cause problems. The device itself contains some intricate shapes which are cast so that they may be inexpensively formed and closed with cover or other flat plates to form the desired passages therein, eliminating heretofore used weld assembly of some prior art devices which made their servicing and cleaning very difficult and resulted in failures, particularly if made of stainless steel, which if welded can fail.

Additionally provisions are made in the device of the present invention to fit a plurality of the vortex separator means or tubes in which the actual separating action occurs. The vortex tubes are formed in parts or portions with one part or portion being formed by a margin of an opening or bore formed in the device and the other part or portion being formed by an insert which communicates with the opening or bore. The insert has one or more liquid inlet slots in the peripheral wall with a liquid chamber and discharge outlet at the bottom and an air or gas bubble containing liquid (foam) outlet at the center top. The insert is removable to permit cleaning of the entire device. The device utilizes wherever possible the flow of liquid therein to sweep and keep the device clean. For example, the openings or spin inducing slots in the vortex tube are situated with respect to the adjacent device wall or floor to create a sweeping action of the adjacent walls or floor by the liquid entering these spin slots. Thus no or reduced build up tends to form on the adjacent walls, as compared to the spin slots located higher or above the adjacent walls or floor. In addition to cleanability and the ability to also "run clean", the smooth streamline construction utilized in the device wherever possible, results in a reduced pressure drop, higher operating efficiency and reduced pumping demands to operate the device. Additionally, the different inserts can be made and installed to optimize the device's performance for the particular applications depending upon the liquid and or gases characteristics, the desired flow rate, the velocity of the liquid, its rate of vortex spin, the pressure differential utilized to create the vortex spin, and the viscosity of the liquid. For example, the spin inducing slots formed in the vortex or insert tube could be altered in number or shape to optimize performance. Generally the device could be sized to handle a flow rate perhaps larger than anticipated, and then some of the individual vortex separator or tubes closed off to achieve the desired flow rate. While other means could be used to reduce the flow rate, a convenient manner to do so is by replacing the operating insert vortex tube with a plug insert to close off the tube.

It is an object of the present invention to provide a liquid-gas/air bubble separator device which is totally cleanable.

Another object of the present invention is to provide a construction for such a device which minimizes or eliminates build up of materials within such device, which build up could break away and disrupt the operation of the device and or the equipment or process with which it is associated.

Still another object of the present invention is to provide a liquid-gas/air separator which utilizes a plurality of vortex tubes which have the separated liquids (the essentially gas/air free liquid) and any liquid carrying the separated gas/air or bubbles flowing in opposite directions to prevent the possibility of remingling or recontamination.

Yet a further object of the present invention is to provide such a device which utilizes vortex tube inserts which can be replaced to optimize operating characteristics or be replaced should the vortex tubes become worn reducing the unit's efficiency.

Still a further object of the present invention is to provide insert plugs which can be used to block some of the plurality of vortex tubes to reduce and/or optimize the flow capacity of the device.

These and other objects of the present invention will become apparent from the following written description and the accompanying figures of the drawings.

BRIEF DESCRIPTION OF THE DRAWINGS

FIG. 5 is an elevational view of one of the vortex tube inserts shown installed in FIG. 2.

FIG. 6 is a cross-sectional view of the vortex tube insert shown in FIG. 5 and taken along the line 6—6 of FIG. 7.

FIG. 7 is a cross-sectional view of the vortex insert shown in FIG. 5, showing the spin inducing slots.

FIG. 8 is an elevational view, similar to FIG. 5, but showing an insert plug for closing off the vortex tube to reduce the devices flow capacity.

FIG. 9 is a plan view of the vortex tube shown in FIG. 5.

FIG. 10 is an elevational view of full length plug for closing off the vortex tube to reduce the device's flow capacity.

DESCRIPTION OF THE PREFERRED EMBODIMENT

Figure 1:
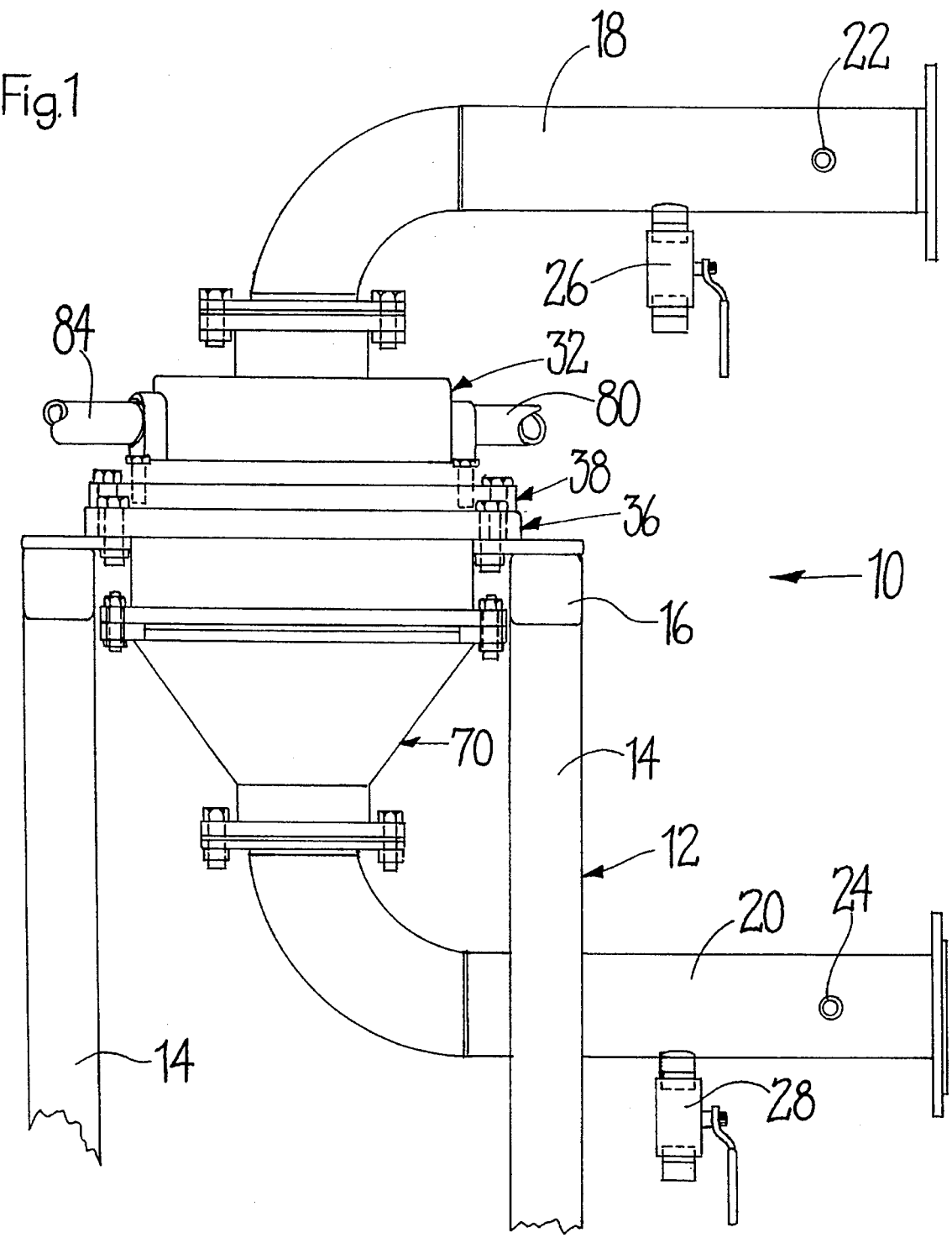
FIG. 1 is an elevational view of the preferred embodiment of liquid-gas/air or bubble separator device of the present invention mounted on stand and showing its liquid inlet and outlet connections.

A preferred embodiment of liquid-gas/air or bubble separator device 10 of the present invention is shown in FIG. 1. The device 10 is particularly suited for providing essentially gas/air bubble free coating liquid to a coater or applicator for coating board or paper webs moving at high speeds in excess of 3,000 feet per minute, 4,500 feet per minute and even 6,000 feet per minute. This device is particularly useful for treating such coating liquids which could have a viscosity of from say 1,000 or less to 10,000 cps viscosity at 20 rpm Brookfield, #5 spindle, or more. In such installations, the coating liquid would flow into the device of the present invention in sufficient quantity or volume to create a pressure drop of from 5 to 25 psi, with a preferred pressure drop range of 10 to 20 psi, relative to inlet vs. outlet pressures. Coating rheology such as viscosity, as well as flow rate affect the pressure drop value.

As is shown in FIG. 1, the device 10 is carried or mounted on a stand 12 having legs 14 and an upper member 16 to which the device 10 is secured. The device 10 includes an inlet hose or pipe 18 which carries the coating liquid which may contain gas/air say in the form of bubbles from a source (not shown), such as a coating supply system or tank. The device 10, further includes an outlet hose or pipe 20 which carries the substantially gas/air bubble free coating liquid which has been treated by the device 10. This gas/air free coating liquid flowing from the lower end of pipe 20 is preferably supplied to a coater or coater system for applying directly or indirectly (as by first application to a roller) the coating liquid to the web of moving paper which could be moving at over 3,000, 4,500, or even 6,000 feet per minute. Pressure taps 22 and 24 and sample taking valves 26 and 28 are provided in the pipes 18 and 20 to measure and monitor the pressure drop across the device 10 and to take samples of coating liquid both before and after treatment by the device 10. While not shown, the coating liquid is supplied to the pipe 18 at a pressure head, as by a pump (not shown). While 18 and 20 are described as pipes they could as mentioned also be hoses which for purposes of this application is considered to fall within the definition of "pipe."

Figure 2:
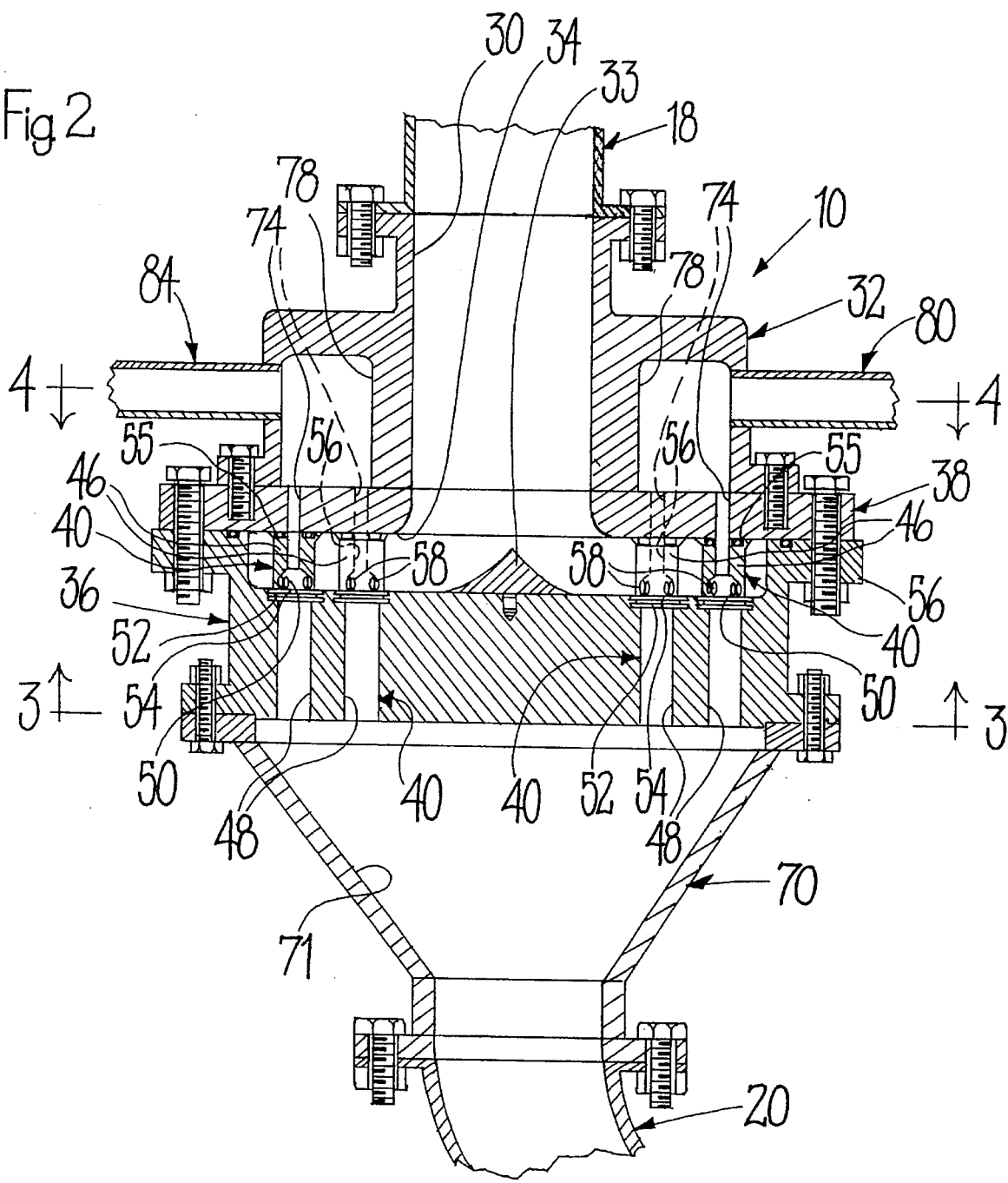
FIG. 2 is an enlarged cross-section of a portion of the device shown in FIG. 1 and taken along the line 2—2 shown in FIG. 3.
Figure 4:
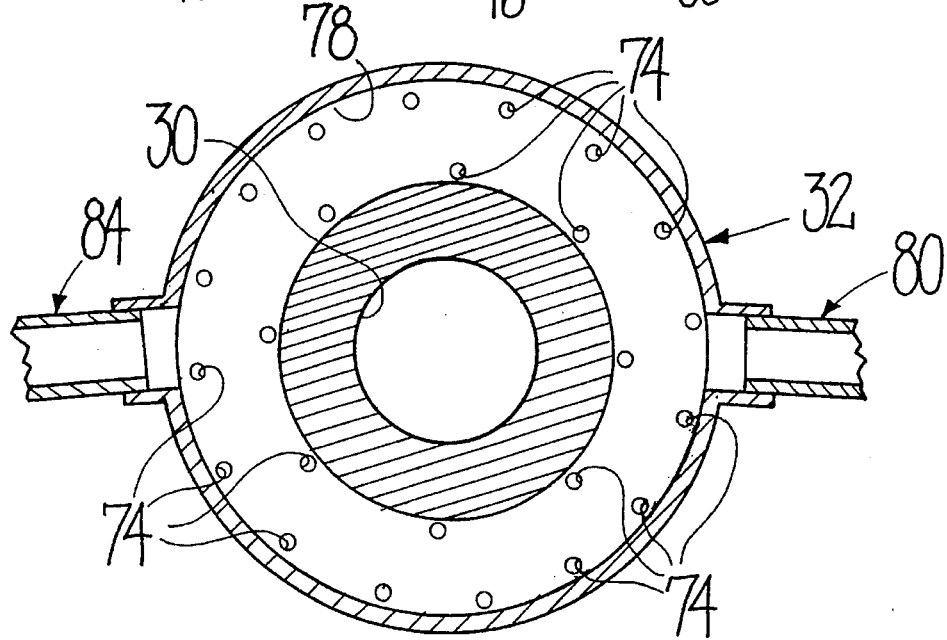
FIG. 4 is another cross-sectional view taken along the line 4—4 of FIG. 2.

Referring now to FIGS. 1 and 2, the device 10 in more detail is shown. As is shown, the inlet pipe 18 leads to an inlet opening 30 formed in an upper cast body 32. A streamline flow, cone shaped deflector 33 is located at the bottom to provide a smooth flow transition. The deflector is removable and held in place as by a screw on its bottom. The bottom of the opening 30 opens onto a cylindrically shaped distribution chamber 34 formed in a middle cast body 36. Sandwiched in between the upper cast body 32 and middle cast body 36 is a flat cover plate 38 which closes off the top periphery of the distribution chamber. As is shown in FIGS. 2 and 4, a plurality of vortex separator means or tubes 40, in this instance twenty-four, are formed. As noted in FIG. 4, these separator means or tubes 40 are arranged spatially about the cylindrical distribution chamber 34, and in this instance in a radially and angular manner, to give free flow from the inlet opening 30 to each of the separator means 40. The upper portions of the separator means 40 stand, column like, in the cylindrical distribution chamber so that the coating liquid can surround these column like portions.

Figure 3:
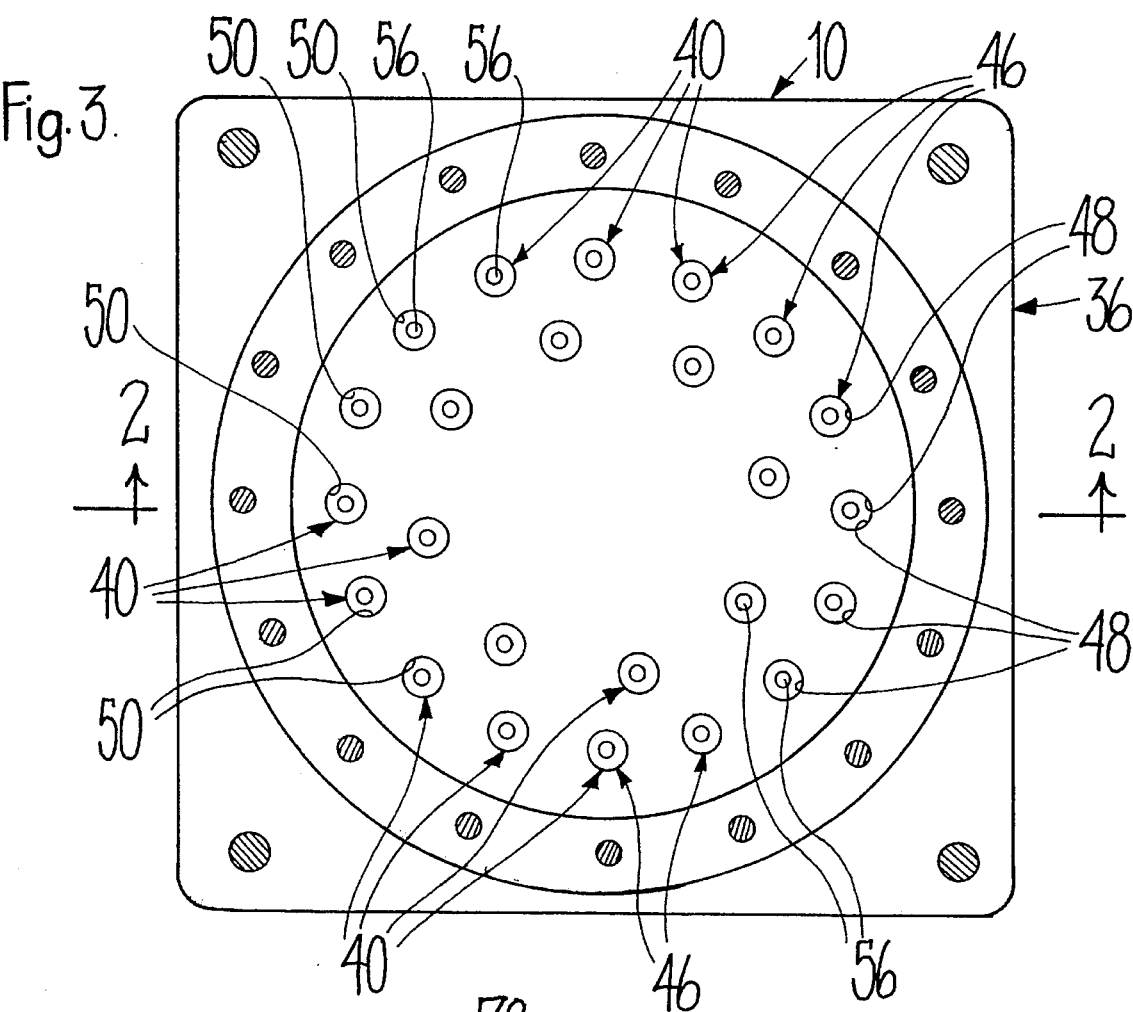
FIG. 3 is a cross-sectional view of the device taken along the line 3—3 of FIG. 2.

Referring to FIGS. 2 and 3, each of the vortex separator means 40 is formed by an upper vortex insert 46 and a lower bore or opening 48 formed in the middle casting member 36. The bore 48 is enlarged at the top and can receive and be sealed to the lower end of the vortex insert 46. As shown in FIGS. 5, 6 and 7, each of the vortex inserts 46 comprises a cylindrical body having a lower cylindrical chamber 50 which is sized to match with the bore 48. The outer periphery of the lower end of the insert 46 is formed to retain a sealing element, in this instance by forming a groove 52 to retain an O-ring 54. The O-ring 54 both retains, at least for assembly, and seals the bottom of the insert 46 to the bores 48 of casting 36. Each of the upper ends of the inserts 46 are sealed to the underside of the cover plate 38, as by an O-ring 55 provided between the top of the insert and cover plate, in this instance in a groove formed in the top of the insert. The top of insert 46 is enlarged to accommodate the O-ring 55. See FIG. 9. The chamber 50 extends about ⅓ to ½ and, in this instance about 2/5, up the height of the insert, terminating with an upper end wall having a small gas/air outlet passage 56 centered therein and extending therethrough. The top outer perimeter of the insert 46 is tapered (like a flat headed screw) to eliminate a square corner where build up could occur.

In the side walls of the lower portion of each insert 46 are formed spin inducing slots 58 which connect the distributing chamber 34 to each of the chambers 50 in the insert. The slots are generally tangential in direction, and one, such as two as in this instance, three or more can be provided in each insert 46 to induce or cause a vortex spin in the chamber 50 and bore 48 which does the actual separation of gas/air or bubbles from the heavier liquid.

As is noted, the lower edge of the slot 58 coincides with the lower edge or floor of the chamber 34 to permit the flow into the numerous slots 58 to sweep the floor of the chamber 34 clean and prevent standing or trapping of liquid or any build up, which could hurt or alter operating characteristics and/or if formed and broken loose might result in a coating defect on the paper or board web. The bottom of the bores 48 discharge into the return for the gas/air free liquid collection chamber 71 formed by the lower cast member 70. This lower cast member is, like all the members 18, 20, 32, 36, 38 releasably fastened together, as by fasteners, such as nuts and bolts, to permit complete disassembly of the device for access to all wetted surfaces and for cleaning. The adjacent mating surfaces of all these members can be sealed as by means of O-rings. The member 70 also tapers inwardly and downwardly toward the discharge pipe 20 to help keep pressure losses low and prevent any unwanted build ups in this area. From pipe or hose 20, the essentially or substantially gas/air bubble free coating liquid can then be supplied to a coater for use.

As is shown in FIGS. 2 and 4 the gas/air or bubbles or any quantities of liquid still carrying the same (foam) therewith is drawn off the top of each of the separating means 40 through the openings 56 which coincide with the plurality (24) of similar openings 74, one for each separator means. These openings 74 are formed in the cover plate 38. The cover plate 38 closes off the bottom of an annular gas or air bubble collection chamber 78 formed in the upper casting 32. The annular chamber 78 in turn exits into the discharge pipe 80 for the gas/air or bubble containing liquid, in the form of foam, which can then be returned to the coating system for reprocessing and/or reuse, eventually to be recycled to the inlet pipe 18, hopefully without the bubbles.

To facilitate cleaning a flush opening, in this instance, is provided in the air/gas collection chamber 78, as indicated by the numeral 84. Water can be supplied to this pipe 84, via a closure valve which would be opened only to permit passage of flush water and would otherwise normally be kept closed. The device is designed to prevent any free standing liquids within so that when liquid is no longer supplied to the device, either by pipe 18 or 84, all liquid will drain from the device including the inlet, the distribution chamber, the vortex separator means, the gas/air collection chamber, the gas/air free liquid collection chamber, the outlet and the associated piping. Additionally another valve (not shown) can be provided in the foam discharge pipe 80 to help achieve the pressure in the device for operation.

From the foregoing it is believed the operation of the device of the present invention is apparent. Coating liquid, perhaps containing gas/air in the form of bubbles which is to be separated, is sent via device inlet pipe 18 into the distribution chamber 34, and then through the slots 58 in the vortex inserts 46. As the liquid passes into the chamber 50 and bore 48, it causes a vortex or spin, which moves the lighter gas/air or bubbles toward the center. The generally gas/air free liquid is force outwardly and forced out the lower outer periphery of the bores 48 forming the separator means 40. From there the essentially or substantially gas/air free liquid is collected in the collector 70 and sent out the device outlet pipe 20 for use at the coater. The gas/air containing liquid at the centers of the vortex of the bores 48 and chambers 50 are drawn upwardly into the annular air/gas collector chamber and sent out the device foam outlet pipe 80 for recycling or other use. Thus, this gas/air containing liquid is kept from the coater, which can operate at higher speeds such as 3,000, 4,500 or 6,000 feet/min without air/gas or bubble entrainment problems which would otherwise occur.

As noted the device is designed for sufficient flow capacity by initially selecting an adequate flow area and number of vortex separators, in this instance 24. The separators can be of a diameter of say from 1 to 1½ inches with generally 1⅛ inches being preferred. With this size separator the spin slot 58 can have a height of say ⅝ to ⅜ inches with a width of ⅛ to 1/5 inches, with generally a height of 7/16 and a width of 5/32 being preferred. The narrower the width is, the thinner the film and the easier for the bubbles to escape. While 24 separator means of approximately 1⅛ inch diameter may be adequate to give a flow rate of 360 gpm, if a lesser flow rate is desired and/or higher velocity is needed to obtain the vortex or separation characteristics desired for the liquid being used, some of the vortex separators can be closed off with, for example, the insert plug 90 shown in FIG. 8. The plug 90 is essentially identical externally to the insert 46, except there is no chamber 50, passage 56 or spin inducing slot 58. Instead the plug is solid. Of course, it need not be solid, but could be hollow as long as it closes off and reduces some of the flow capacity provided by the device. A preferred form of plug 100 which fully closes off the bore 48 too is shown in FIG. 10 and has three O-rings for sealing at the top 102, middle 104 and bottom 106.

The device of the present invention has a flow capacity of 360 gallons per minute with a pressure drop of about 10 psi across the device using a coating liquid with a viscosity of 5,000 cps. With only a portion of the capacity used (say 16 of the 24 vortex separator or tubes) the flow capacity is reduced to 280 gallons per minute with a 12 psi pressure drop for a coating liquid of 6,500 cps viscosity. While this preferred embodiment for the paper industry and particularly the supply of bubble free coating for a paper coating process is shown, the device of present invention has uses in other fields.

While only the preferred embodiment of gas/air separation device of the present invention has been illustrated and described, from the foregoing it should be understood that variations, modification and equivalent structures thereof and therefore fall within the scope of the appended claims.

What is claimed is:

1. A liquid-gas/air separator device for providing substantially gas/air bubble free liquid from a liquid which may contain gas/air, comprising an upper inlet for the liquid which may contain gas/air, a distribution chamber below and in communication with said upper inlet, two or more vortex separators contained in said device and being located below and in communication with said distribution chamber, each of said vortex separators having at least one spin inducing liquid slot therein for causing a vortex spin therein, said vortex separators being hollow inside and free of any obstruction therein, a collection chamber below and in communication with said two or more vortex separators for receiving the substantially gas/air free liquid from said two or more separators, a lower outlet for receiving substantially gas/air free liquid from said collection chamber, a gas/air collection chamber above and in communication with said two or more vortex separators, an outlet for the gas/air collection chamber in communication with said gas/air collection chamber, said spin inducing slots in said vortex separators cause said liquid from said distribution chamber entering said two or more vortex separators to spin to separate the gas/air which travels upwardly out of the vortex separator assisted by buoyancy while the substantially gas/air free liquid travels downwardly from said upper inlet to said lower outlet assisted by gravity out of the vortex separator, wherein said upper inlet is substantially in-line and above said lower outlet, and the liquid flow from said upper inlet to said lower outlet is substantially downwardly, while any gas/air separated from said liquid flow travels upwardly, whereby a substantially gas/air free liquid may be provided at said lower outlet of the device.

2. A liquid-gas/air separator device for providing substantially gas/air bubble free liquid from a liquid which may contain gas/air, comprising an inlet for the liquid which may contain gas/air, a distribution chamber in communication with said inlet, two or more vortex separators contained in said device and being located below and in communication with said distribution chamber, each of said vortex separators having at least one spin inducing liquid slot therein for causing a vortex spin therein, said vortex separators being hollow inside and free of any obstruction therein, a collection chamber below and in communication with said two or more vortex separators for receiving the substantially gas/air free liquid from said two or more separators, an outlet for receiving substantially gas/air free liquid from said collection chamber, a gas/air collection chamber above and in communication with said two or more vortex separators, an outlet for the gas/air collection chamber in communication with said gas/air collection chamber, said spin inducing slots in said vortex separators cause said liquid from said distribution chamber entering said two or more vortex separators to spin to separate the gas/air which travels upwardly out of the vortex separator assisted by buoyancy while the substantially gas/air free liquid travels downwardly assisted by gravity out of the vortex separator, wherein each of said vortex separators is made in at least first and second portions, said first portions being formed by the margins of said device and the second portions being replaceable inserts, whereby a substantially gas/air free liquid may be provided at said outlet of the device.

3. A separator as in claim 2, wherein in said spin inducing slots are formed in said inserts, said inserts also having lower, larger discharge openings for flow of liquid downwardly and smaller centered openings for flow of gas/air upwardly.

4. A separator as in claim 2, further comprising an insert plug for closing off at least one of said vortex separators to reduce the flow capacity of said device and alter the velocity of the liquid flowing through the other of the vortex separators.

5. A separator as in claim 3, wherein said distribution chamber has a lower floor, said spin inducing slots also have lower floors, and the lower floors of said distribution chamber and said spin inducing slots are at the same level, whereby the flow of liquid from said distribution chamber into said slots assists to keep said distribution chamber clean.

6. A separator as in claim 1, wherein each of said distribution chamber, collection chamber and gas/air collection chamber is of cast construction and assembled to said device with releasable fasteners to permit disassembly of the device and the respective chambers for cleaning and access to said two or more vortex separators.

7. A separator device as in claim 6, wherein each of said cast chambers is formed of a stainless steel compatible with paper coating liquid, and the remainder of said separator device is also substantially formed of a stainless steel compatible with paper coating liquid.

8. A separator device as in claim 1, further comprising a flush inlet in said device in communication with said gas/air collection chamber for admitting a flush into said gas/air collection chamber to flush said gas/air collection chamber, said vortex separators, said distribution chamber and said gas/air free liquid collection chamber.

9. A separator device as in claim 1, wherein said upper inlet, said distribution chamber, said vortex separators, said gas/air collection chamber, said gas/air free liquid collection chamber and said lower outlet are free draining and leaving substantially no liquid standing in said device when no liquid is supplied to said device.

10. A liquid-gas/air separator device for providing substantially gas/air free liquid from a liquid which may contain gas/air, comprising an inlet for the liquid which may contain gas/air, a distribution chamber in communication with said inlet, a plurality of vortex separators contained in said device and being located below and in communication with said distribution chamber, each of said vortex separators having two or more spin inducing liquid slots therein for causing a vortex spin therein, the vortex separators being hollow inside and free of any obstructions therein, a collection chamber below and in communication with said plurality of vortex separators for receiving the substantially gas/air free liquid from said plurality of vortex separators, an outlet for receiving substantially gas/air free liquid from said collection chamber, a gas/air collection chamber above and in communication with said plurality of vortex separators, an outlet for the gas/air in communication with said gas/air collection chamber, said liquid from said inlet entering said plurality of vortex separators with a spin being induced in the same by said spin inducing slots to separate the gas/air which travels upwardly out of the vortex separator assisted by buoyancy while the substantially gas/air free liquid travels downwardly assisted by gravity out of the vortex separator, said inlet being directly above said outlet, and the liquid flow from said inlet to said outlet being substantially downwardly, with any gas/air separated from said liquid flowing upwardly, each of said plurality of vortex separators being made in at least two parts, one part being formed by the margins of said device and the other part being a replaceable insert insertable into said margins, said spin inducing slots being formed in said inserts, said inserts having lower chambers opening at the bottom for flow of liquid downwardly and small centered openings for flow of gas/air upwardly, said distribution chamber having a lower floor, said spin inducing slots also having lower floors, and the lower floors of said distribution chamber and said spin inducing slots being at the same level to promote the flow of liquid from said distribution chamber into said spin inducing slots to keep said distribution chamber clean, each of said distribution chamber, collection chamber and gas/air collection chamber being of cast construction and assembled to said device with releasable fasteners to permit disassembly of the device and the respective chambers for cleaning and access to said plurality of vortex separators, each of said cast chambers being formed of a stainless steel compatible with paper coating liquid, and the remainder of said separator device is substantially formed of a stainless steel compatible with paper coating liquid.

11. A separator as in claim 2, wherein each of said distribution chamber, collection chamber and gas/air collection chamber is of cast construction and assembled to said device with releasable fasteners to permit disassembly of the device and the respective chambers for cleaning and access to said two or more vortex separators.

12. A separator device as in claim 11, wherein each of said cast chambers is formed of a stainless steel compatible with paper coating liquid, and the remainder of said separator device is also substantially formed of a stainless steel compatible with paper coating liquid.

13. A separator device as in claim 2, further comprising a flush inlet in said device in communication with said gas/air collection chamber for admitting a flush into said gas/air collection chamber to flush said gas/air collection chamber, said vortex separators, said distribution chamber and said gas/air free liquid collection chamber.

14. A separator device as in claim 2, wherein said inlet, said distribution chamber, said vortex separators, said gas/air collection chamber, said gas/air free liquid collection chamber and said outlet are free draining and leaving substantially no liquid standing in said device when no liquid is supplied to said device.

15. An in-line liquid flow liquid-gas separator device for providing gas free liquid from a liquid which may contain gas, comprising an upper inlet for the liquid which may contain gas, a distribution chamber below said upper inlet and in communication with said upper inlet, a plurality of vortex separators contained in said device and being located below and in communication with said distribution chamber, each of said vortex separators having two spin inducing liquid slots therein for causing a vortex spin therein, the vortex separators being hollow inside and free of any obstructions therein, a collection chamber below and in communication with said plurality of vortex separators for receiving the gas free liquid from said plurality of vortex separators, a lower outlet for receiving gas free liquid from said collection chamber, a gas collection chamber above and in communication with said plurality of vortex separators, an upper outlet for the collected gas in communication with said gas collection chamber, said liquid from said upper inlet entering said plurality of vortex separators with a spin being induced in the same by said two spin inducing slots to separate the gas which travels inwardly and upwardly out of the vortex separator assisted by buoyancy while the gas free liquid travels outwardly and downwardly assisted by gravity out of the vortex separator toward said lower inlet, said upper inlet being directly above said lower outlet, and the liquid flow from said upper inlet to said lower outlet being in-line and downwardly, with any gas separated from said liquid upwardly, each of said plurality of vortex separators being made in at least two parts, one part being formed by the margins of said device and the other part being a replaceable insert insertable into said margins, said spin inducing slots being formed in said inserts, said inserts having lower chambers opening at the bottom for flow of liquid downwardly toward said lower outlet and small centered openings for flow of gas upwardly toward said upper outlet, said distribution chamber having a lower surface, said spin inducing slots also having lower surfaces, and the lower surfaces of said distribution chamber and said spin inducing slots being at the same level to promote the flow of liquid from said distribution chamber into said spin inducing slots to keep said distribution chamber clean, each of said distribution chamber, collection chamber and gas collection chamber being of cast construction and assembled to said device with releasable fasteners to permit disassembly of the device and the respective chambers for cleaning and access to said plurality of vortex separators, each of said cast chambers being formed of a stainless steel compatible with paper coating liquid, and the remainder of said separator device is formed of a stainless steel compatible with paper coating liquid.

16. The device of claim 15, further including a unitary body located between said distribution chamber and said collection chamber, said vortex separators margins being formed in said unitary body by the margins of said body.

17. The device of claim 1, further including a unitary body located between said distribution chamber and said collection chamber, said vortex separators being formed in said unitary body.

18. The device of claim 2, further including a unitary body located between said distribution chamber and said collection chamber, said vortex separators being formed in said unitary body.

* * * * *